United States Patent
Tchakarov et al.

(10) Patent No.: US 10,072,490 B1
(45) Date of Patent: *Sep. 11, 2018

(54) BOUNDARY TRACKING CONTROL MODULE FOR ROTARY STEERABLE SYSTEMS

(71) Applicant: WELL RESOLUTIONS TECHNOLOGY, Houston, TX (US)

(72) Inventors: Borislav J. Tchakarov, Houston, TX (US); Tsili Wang, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,459

(22) Filed: Mar. 27, 2018

Related U.S. Application Data

(63) Continuation-in-part of application No. 15/920,034, filed on Mar. 13, 2018, which is a continuation of application No. 15/696,543, filed on Sep. 6, 2017, now Pat. No. 9,952,347, which is a continuation of application No. 15/466,507, filed on Mar. 22, 2017, now Pat. No. 9,767,153, which is a continuation of application No. 14/993,165, filed on Jan. 12, 2016, now Pat. No. 9,645,276, which is a continuation of application No. 14/303,232, filed on Jun. 12, 2014, now Pat. No. 9,268,053.

(Continued)

(51) Int. Cl.
| | |
|---|---|
| *E21B 44/00* | (2006.01) |
| *E21B 7/06* | (2006.01) |
| *E21B 49/00* | (2006.01) |
| *E21B 47/02* | (2006.01) |
| *E21B 47/09* | (2012.01) |
| *E21B 17/10* | (2006.01) |
| *E21B 47/024* | (2006.01) |

(52) U.S. Cl.
CPC .......... *E21B 44/005* (2013.01); *E21B 7/062* (2013.01); *E21B 47/024* (2013.01); *E21B 47/09* (2013.01); *E21B 49/00* (2013.01); *E21B 17/1078* (2013.01)

(58) Field of Classification Search
CPC .......... E21B 7/04; E21B 7/62; E21B 17/1014; E21B 47/02; E21B 47/022; E21B 47/02216; E21B 47/026
See application file for complete search history.

(56) References Cited

U.S. PATENT DOCUMENTS

| | | | | |
|---|---|---|---|---|
| 4,899,112 | A | * | 2/1990 | Clark ................ G01V 3/30 324/338 |
| 5,603,386 | A | * | 2/1997 | Webster ............. E21B 7/062 175/325.3 |

(Continued)

*Primary Examiner* — Jennifer H Gay
(74) *Attorney, Agent, or Firm* — Gregory L. Porter; Lloyd L. Davis; Hunton Andrews Kurth LLP

(57) ABSTRACT

A rotary steerable system includes a non-rotating housing, azimuthal resistivity antennas and electronics, disposed within the non-rotating housing, configured to measure a distance to an approaching upper or lower formation boundary, and a control module configured to steer a drill bit along a well path and, based on measurements from the azimuthal resistivity antennas, to steer the housing away from the approaching upper or lower formation boundary and thereby maintain a certain distance between the steerable housing and upper or lower formation boundary.

20 Claims, 13 Drawing Sheets

Related U.S. Application Data

(60) Provisional application No. 62/834,272, filed on Jun. 12, 2013.

(56) References Cited

U.S. PATENT DOCUMENTS

| | | | | |
|---|---|---|---|---|
| 6,234,259 B1* | 5/2001 | Kuckes | ............... | E21B 7/062 175/61 |
| 6,427,783 B2* | 8/2002 | Krueger | ............... | E21B 7/062 175/325.3 |
| 6,438,495 B1 | 8/2002 | Chau et al. | | |
| 6,467,557 B1* | 10/2002 | Krueger | ............... | E21B 4/18 175/104 |
| 7,027,926 B2* | 4/2006 | Haugland | ............... | G01V 11/00 702/10 |
| 7,222,681 B2* | 5/2007 | Jones | ............... | E21B 47/12 175/38 |
| 7,245,229 B2* | 7/2007 | Baron | ............... | E21B 47/12 340/853.1 |
| 7,287,604 B2* | 10/2007 | Aronstam | ............... | E21B 7/062 175/61 |
| 7,436,184 B2* | 10/2008 | Moore | ............... | G01V 3/24 166/66.5 |
| 7,659,722 B2* | 2/2010 | Bittar | ............... | G01V 3/28 324/337 |
| 7,950,473 B2* | 5/2011 | Sugiura | ............... | E21B 7/062 175/45 |
| 8,676,558 B2 | 3/2014 | Pirovolou | | |
| 9,097,820 B2 | 8/2015 | Rasheed | | |
| 9,206,644 B2* | 12/2015 | Clark | ............... | E21B 4/02 |
| 9,268,053 B2* | 2/2016 | Wang | ............... | G01V 3/12 |
| 9,273,517 B2 | 3/2016 | Tchakarov et al. | | |
| 9,404,355 B2 | 8/2016 | Bayliss | | |
| 9,540,922 B2* | 1/2017 | Zhong | ............... | E21B 47/02216 |
| 9,645,276 B2* | 5/2017 | Wang | ............... | G01V 3/12 |
| 9,767,153 B2* | 9/2017 | Wang | ............... | G06F 17/30486 |
| 9,797,204 B2* | 10/2017 | Kirkhope | ............... | E21B 17/06 |
| 9,835,020 B2 | 12/2017 | Bayliss et al. | | |
| 9,850,712 B2 | 12/2017 | Sugiura | | |
| 9,851,467 B2* | 12/2017 | Bittar | ............... | G01V 3/28 |
| 9,952,347 B2* | 4/2018 | Wang | ............... | G01V 3/12 |
| 2001/0042643 A1* | 11/2001 | Krueger | ............... | E21B 7/062 175/73 |
| 2001/0052428 A1* | 12/2001 | Larronde | ............... | E21B 7/062 175/61 |
| 2005/0056463 A1* | 3/2005 | Aronstam | ............... | E21B 7/062 175/61 |
| 2005/0189946 A1* | 9/2005 | Moore | ............... | E21B 47/0002 324/338 |
| 2006/0011385 A1* | 1/2006 | Seydoux | ............... | G01V 3/28 175/61 |
| 2006/0208738 A1* | 9/2006 | Moore | ............... | G01V 3/24 324/344 |
| 2007/0107937 A1* | 5/2007 | Sugiura | ............... | E21B 7/062 175/45 |
| 2007/0289373 A1* | 12/2007 | Sugiura | ............... | E21B 7/062 73/152.46 |
| 2010/0126770 A1* | 5/2010 | Sugiura | ............... | E21B 7/062 175/38 |
| 2011/0133740 A1* | 6/2011 | Seydoux | ............... | G01V 3/28 324/338 |
| 2011/0234230 A1* | 9/2011 | Bittar | ............... | E21B 47/01 324/333 |
| 2011/0308794 A1* | 12/2011 | Bittar | ............... | E21B 47/02216 166/254.2 |
| 2012/0186873 A1* | 7/2012 | Shayegi | ............... | E21B 21/08 175/25 |
| 2012/0298420 A1* | 11/2012 | Seydoux | ............... | E21B 47/02 175/26 |
| 2013/0226459 A1* | 8/2013 | Gorek | ............... | G01V 3/28 702/7 |
| 2013/0226461 A1* | 8/2013 | Yu | ............... | G01V 3/24 702/9 |
| 2014/0097026 A1* | 4/2014 | Clark | ............... | E21B 4/02 175/61 |
| 2014/0107929 A1* | 4/2014 | Zhong | ............... | E21B 7/04 324/337 |
| 2014/0368197 A1* | 12/2014 | Wang | ............... | G01V 3/12 324/333 |
| 2014/0368199 A1* | 12/2014 | Bittar | ............... | E21B 7/04 324/337 |
| 2015/0144401 A1* | 5/2015 | Nagaraj | ............... | E21B 7/04 175/45 |
| 2016/0124107 A1* | 5/2016 | Wang | ............... | G01V 3/12 324/339 |
| 2016/0245080 A1* | 8/2016 | Sun | ............... | G01V 3/18 |
| 2016/0356099 A1* | 12/2016 | Kirkhope | ............... | E21B 7/062 |
| 2017/0130543 A1* | 5/2017 | Hagar | ............... | E21B 21/08 |
| 2017/0193050 A1* | 7/2017 | Wang | ............... | G01V 3/12 |
| 2017/0234081 A1* | 8/2017 | Kirkhope | ............... | E21B 17/06 166/378 |
| 2017/0242153 A1* | 8/2017 | Yang | ............... | E21B 47/026 |
| 2017/0248013 A1* | 8/2017 | Yang | ............... | E21B 49/003 |
| 2017/0350229 A1* | 12/2017 | Hoehn | ............... | E21B 7/04 |
| 2017/0371063 A1* | 12/2017 | Wang | ............... | G01V 3/30 |

\* cited by examiner

BOUNDARY TRACKING CONTROL MODULE FOR ROTARY STEERABLE SYSTEMS

CROSS-REFERENCE TO RELATED APPLICATIONS

This application is a continuation-in-part of U.S. application Ser. No. 15/920,034 filed Mar. 13, 2018, which is a continuation of U.S. Pat. No. 9,952,347 filed Sep. 6, 2017, which is a continuation of U.S. Pat. No. 9,767,153 filed Mar. 22, 2017, which is a continuation of U.S. Pat. No. 9,645,276 filed Jan. 12, 2016, which is a continuation of U.S. Pat. No. 9,268,053 filed Jun. 12, 2014, which claims priority to U.S. Provisional Application No. 61/834,272 filed Jun. 12, 2013, all of which are hereby incorporated by reference in their entireties.

FIELD

Embodiments disclosed herein relate to rotary steerable systems. More particularly, embodiments disclosed herein relate to a boundary tracking control module for rotary steerable systems.

BACKGROUND

Directional drilling is a method of controlling the direction and deviation of a wellbore to reach a pre-determined underground target or location. This may be accomplished in a number of ways including through the use of whipstocks, bottom hole assembly configurations, instruments to measure the path of the wellbore in three-dimensional space, data links to communicate measurements taken downhole to the surface, mud motors and special BHA components, including rotary steerable systems, and drill bits.

FIG. 1 illustrates a conventional rotary steerable system used in drilling an extended horizontal section. The conventional rotary steerable bottom hole assembly ("BHA") may include a drill bit (1), a rotary steerable system (2), a stabilizer (3), a pulser/battery/electromagnetic ("EM") transmitter (4), a mud motor (5), a measurement-while-drilling ("MWD") tool (6), heavy wall drill pipe (7), and a drill collar (8). FIG. 2 illustrates a perspective view of a conventional rotary steerable system ("RSS") (9). The RSS (9) includes hydraulic rams (10) that are radially extendable outward to press against the wellbore thereby causing the drill bit (1) to press on the opposite side causing a direction change. The RSS (9) may also include a short hop transmitter gap (11) and receiver gap (12). A bit box (13) may be disposed between the drill bit (1) and the RSS (9). However, there is still need for an improved RSS.

SUMMARY OF THE INVENTION

In one aspect, embodiments disclosed herein relate to a rotary steerable bottom hole assembly that includes a drill bit disposed at a distal end thereof, a stabilizer disposed in the bottom hole assembly uphole from the drill bit, and a non-rotating steerable housing disposed between the stabilizer and the drill bit. The non-rotating steerable housing includes azimuthal resistivity antennas and electronics configured to measure a distance to an approaching formation boundary, and a control module configured to steer the drill bit along a well path and, based on measurements from the azimuthal resistivity antennas, to steer the housing away from the approaching formation boundary and thereby maintain a certain distance between the steerable housing and upper or lower boundaries of a formation.

In another aspect, embodiments disclosed herein relate to a rotary steerable system that includes a non-rotating housing, azimuthal resistivity antennas and electronics, disposed within the non-rotating housing, configured to measure a distance to an approaching upper or lower formation boundary, and a control module configured to steer a drill bit along a well path and, based on measurements from the azimuthal resistivity antennas, to steer the housing away from the approaching upper or lower formation boundary and thereby maintain a certain distance between the steerable housing and upper or lower formation boundary.

In yet another aspect, embodiments disclosed herein relate to a method of directional drilling that includes steering a drill bit along a well path by operating a rotary steerable system having a control module enclosed within a non-rotating steerable housing, measuring a distance between the steerable housing and a distance to an approaching upper or lower formation boundary with azimuthal resistivity antennas disposed within the non-rotating steerable housing, and steering the drill bit away from the approaching upper or lower formation boundary, based on the azimuthal resistivity measurements, to maintain a certain distance between the steerable housing and the approaching upper or lower boundary of the formation.

BRIEF DESCRIPTION OF THE DRAWINGS

The invention is illustrated in the accompanying drawings wherein,

FIG. 4b illustrates an enlarged perspective cutaway view of the improved rotary steerable system of FIG. 4a.

DETAILED DESCRIPTION

Figure 1:
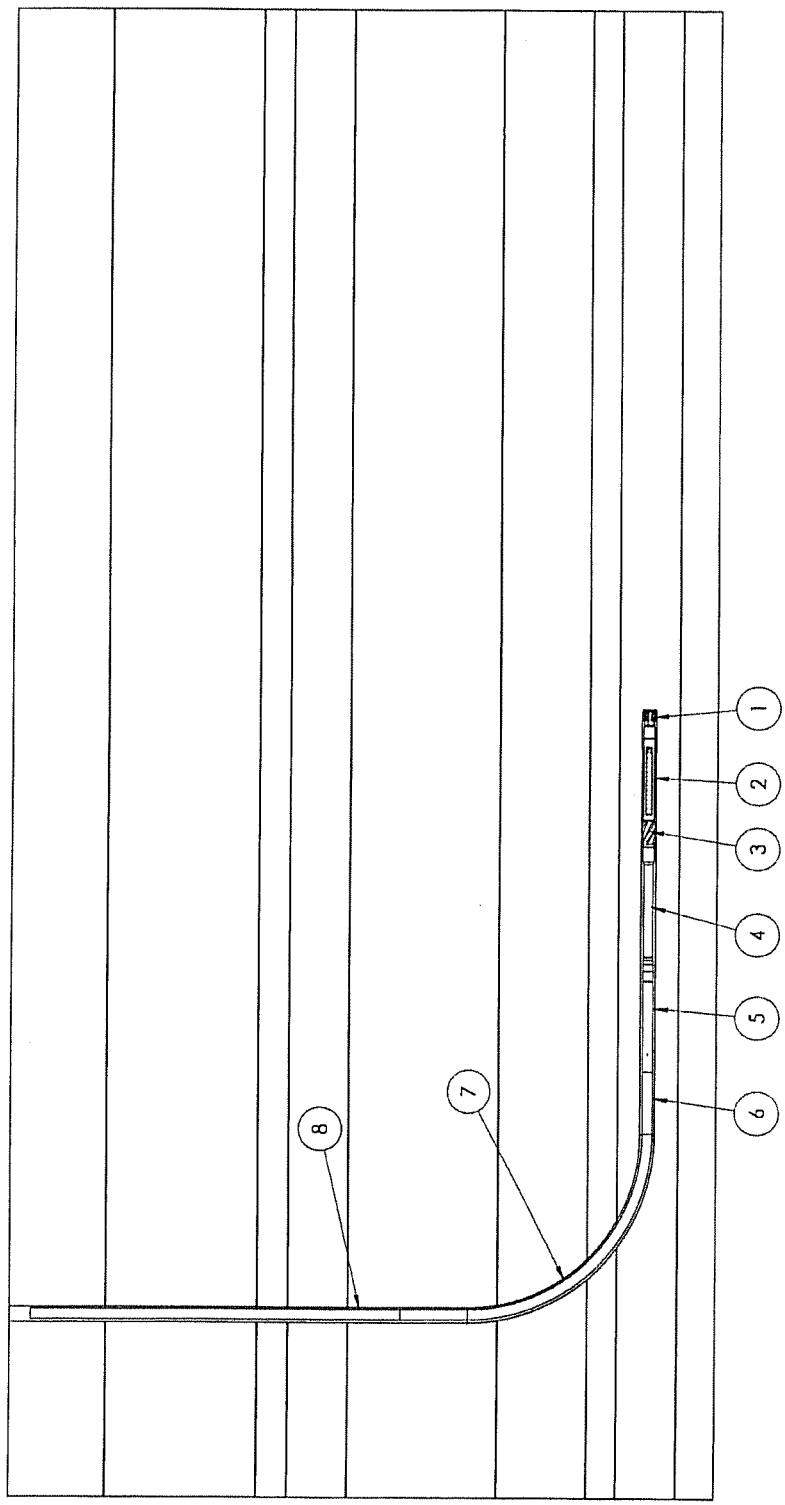
FIG. 1 illustrates a conventional rotary steerable bottom hole assembly used in directional drilling an extended horizontal section.
Figure 2:
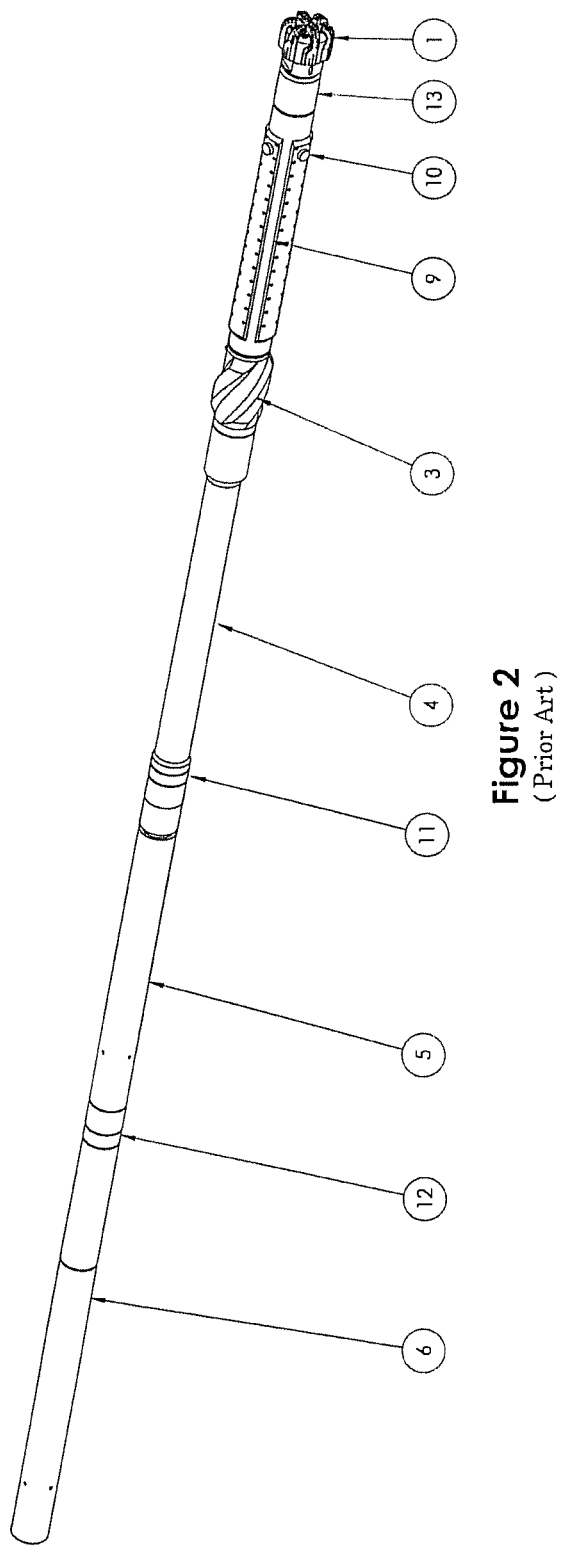
FIG. 2 illustrates a perspective view of a conventional rotary steerable bottom hole assembly.

Embodiments disclosed herein relate to an improved rotary steerable system ("RSS") for directional drilling. More particularly, embodiments disclosed herein relate to a boundary tracking control module that is integrated within a RSS. The rotary steerable BHA may include a drill bit, a RSS housing, a stabilizer, a pulser/battery/electromagnetic ("EM") transmitter, a mud motor, and a measurement-whiledrilling ("MWD") tool, and other components such as drill pipe or drill collars disposed above.

The RSS housing may be disposed between a drill bit and a stabilizer. The RSS housing may include one or multiple hydraulic pistons and rams arranged around a circumference of the housing. The pistons and rams are radially extendable inward and outward by a hydraulic pump and pump drive, enclosed within the RSS housing, to press against the wellbore thereby causing the drill bit to press on the opposite side of the wellbore causing the drill bit to change the wellbore direction. This configuration is known in the industry as "push-the-bit". However, it should be understood that embodiments disclosed herein for an improved RSS may also be employed in "point-the-bit" configuration, which are also known and understood.

In certain embodiments, the RSS housing does not rotate at all, i.e., zero (0) revolutions per hour. In other embodiments, the RSS may be "non-rotating", which includes not rotating at all, but also includes rotating very slowly. For example, "non-rotating", as used herein, may include rotating at less than five (5) revolutions per hour, or less than ten (10) revolutions per hour, or less than fifteen (15) revolutions per hour, or less than twenty (20) revolutions per hour, or less than twenty five (25) revolutions per hour, or less than thirty (30) revolutions per hour, or less than forty (40) revolutions per hour. "Non-rotating" may also include rotating much slower relative to "rotating" components, such as those components from the surface down to the mud motor, e.g., drill pipe. "Rotating", as used herein, for components from the surface down to the mud motor may include rotating at or greater than 1,000 revolutions per hour, or greater than 1,500 revolutions per hour, or greater than 2,000 revolutions per hour, or greater than 3,000 revolutions per hour, or greater than 4,000 revolutions per hour, or greater than 5,000 revolutions per hour, or greater than 6,000 revolutions per hour. "Rotating", as used herein, for components from the mud motor down to the drill bit, e.g., stabilizer and drill bit, may include rotating at greater than 15,000 revolutions per hour, or greater than 20,000 revolutions per hour, or greater than 25,000 revolutions per hour, or greater than 30,000 revolutions per hour.

The RSS housing encloses azimuthal resistivity measurement antennas, which may be either transmitting or receiving antennas, of which there may be any number in any antenna placement or arrangement. The azimuthal resistivity antennas are configured to provide imaging capabilities of the surrounding formation, including formation boundaries, without rotating. For example, azimuthal resistivity antennas capable of imaging without rotating may be those described in U.S. Pat. No. 9,767,153, U.S. Pat. No. 9,645,276, U.S. Pat. No. 9,268,053, and U.S. Publication No. 2017/0371063, all of which are assigned to the same assignee, and hereby incorporated herein by reference in their entireties. Any other antennas capable of azimuthal resistivity measurements in a non-rotating mode may be used in accordance with embodiments disclosed herein.

The RSS housing also encloses an azimuthal resistivity measurement antenna electronics, also referred to herein as "measurement electronics." The measurement electronics control and operate the azimuthal resistivity antennas for making measurements of the surrounding formation, including formation boundaries. The RSS also encloses azimuthal resistivity measurement antenna tuning electronics that are configured to condition antenna signals to make sure the antennas are measuring properly, e.g., calibration.

The RSS housing also encloses a control module. The control module may be any type of microprocessor unit ("MPU") or module which incorporates the functions of all central processing for the rotary steerable system on a single integrated circuit ("IC"), or at most a few integrated circuits. The control module may be a multipurpose, clock driven, register based, digital-integrated circuit which accepts binary data as input, processes it according to instructions stored in its memory, and provides results as output.

The control module of embodiments disclosed herein may be configured to execute a pre-programmed well trajectory, e.g., a three-dimensional "well plan" or path, or may execute commands from the MWD device downlinked from the surface. For example, the control module may be configured to execute a pre-programmed well trajectory which includes azimuth (or direction), which is the angle in degrees between a horizontal component of a wellbore axis and the reference north (the azimuth value varies from 0 degrees to 360 degrees in a clock-wise direction; north is represented as 0 degrees or 360 degrees; east as 90 degrees; south as 180 degrees; west as 270 degrees), and total vertical depth ("TVD"). This may be referred to as a "geometric setting."

In addition, the control module of embodiments disclosed herein may be pre-programmed to maintain a certain or desired distance between a centerline of a rotary steerable system and a formation boundary above or below the rotary steerable system. This may be referred to as a "boundary tracking setting." The control module may be pre-preprogrammed with a full well trajectory and the boundary tracking setting prevents the drill bit from exiting the desired formation if an upper or lower boundary turns out to be in a slightly different location. That is, the control module is configured to control a vertical component of the three-dimensional well path to avoid exiting from the formation, or a desired portion of the formation, either through a top or bottom of the formation. To do so, the azimuthal measurement antennas "track the boundaries" for the formation above or below by determining the distance to a boundary when close to it. For example, the azimuthal measurement antennas may determine the distance when within less than five feet, or less than four feet, or less than three feet, or less than two feet, or less than one foot from a boundary. Upon detecting that the rotary steerable system is about to exit through a formation boundary, or is too close to a formation boundary (e.g., less than a certain or desired distance), the control module corrects the rotary steerable system path.

Accordingly, once the geometric and boundary tracking settings are pre-programmed, the control module acts autonomously in responding to the changing geology of a formation, much like a self-driving vehicle. As the rotary steerable system is travelling along a pre-programmed azimuth (or direction), the azimuthal resistivity measurement antennas are measuring its distance from formation boundaries above or below, and based on the measurements, the control module is determining whether correction up or down is needed to avoid exiting the formation. Thus, the control module steers the rotary steerable system to stay within the producing formation and/or reach a pre-determined target or location in the formation.

Boundary tracking data may be based on a tool face ("TF") angle obtained by the control module. In certain embodiments, if the azimuthal resistivity measurement antennas require their own tool face sampling, the tool face angle at the control module may be corrected by entering an angle value for the radial offset between the control module and the measurement electronics. The control module is configured to measure TF angle and, if necessary, to make corrections to inclination or azimuth. The control module may be configured to communicate with the pulser/battery/ electromagnetic ("EM") transmitter and/or the MWD tool, In certain embodiments, the control module and the measurement electronics may be axially aligned to avoid making a tool face offset correction. For example, the control module and the measurement electronics may be hard mounted on the same platform within the non-rotating RSS such that they are axially aligned.

Figure 3:
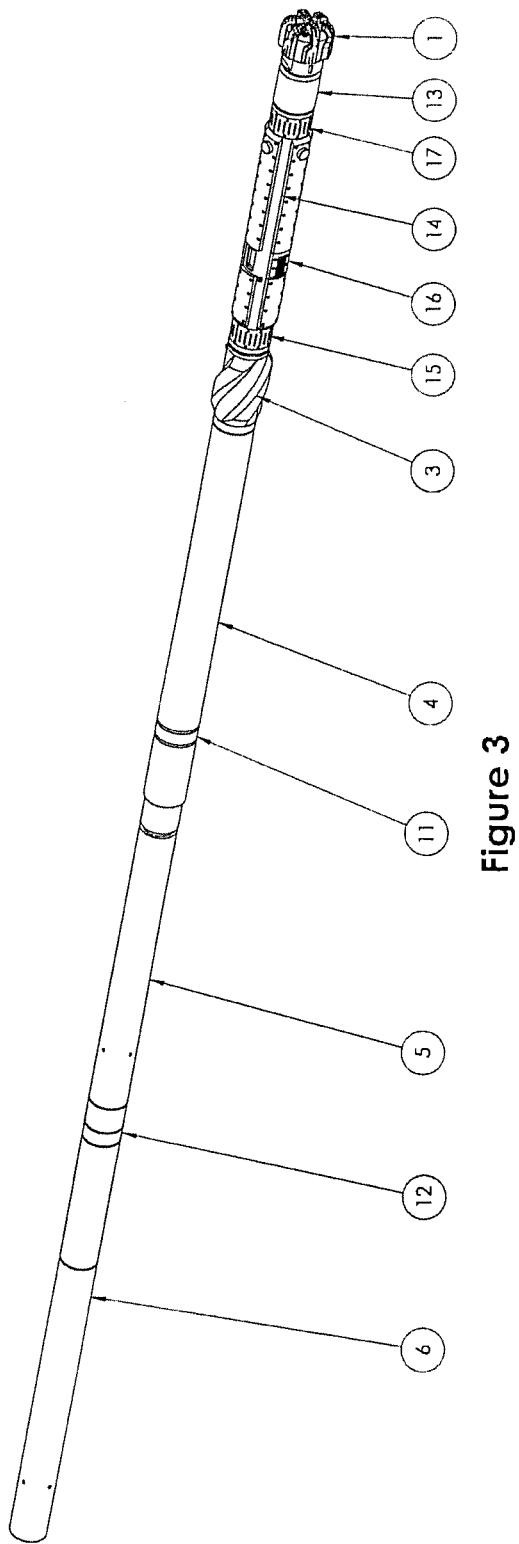
FIG. 3 illustrates a perspective view of an embodiment of an improved rotary steerable bottom hole assembly.
Figure 4A:
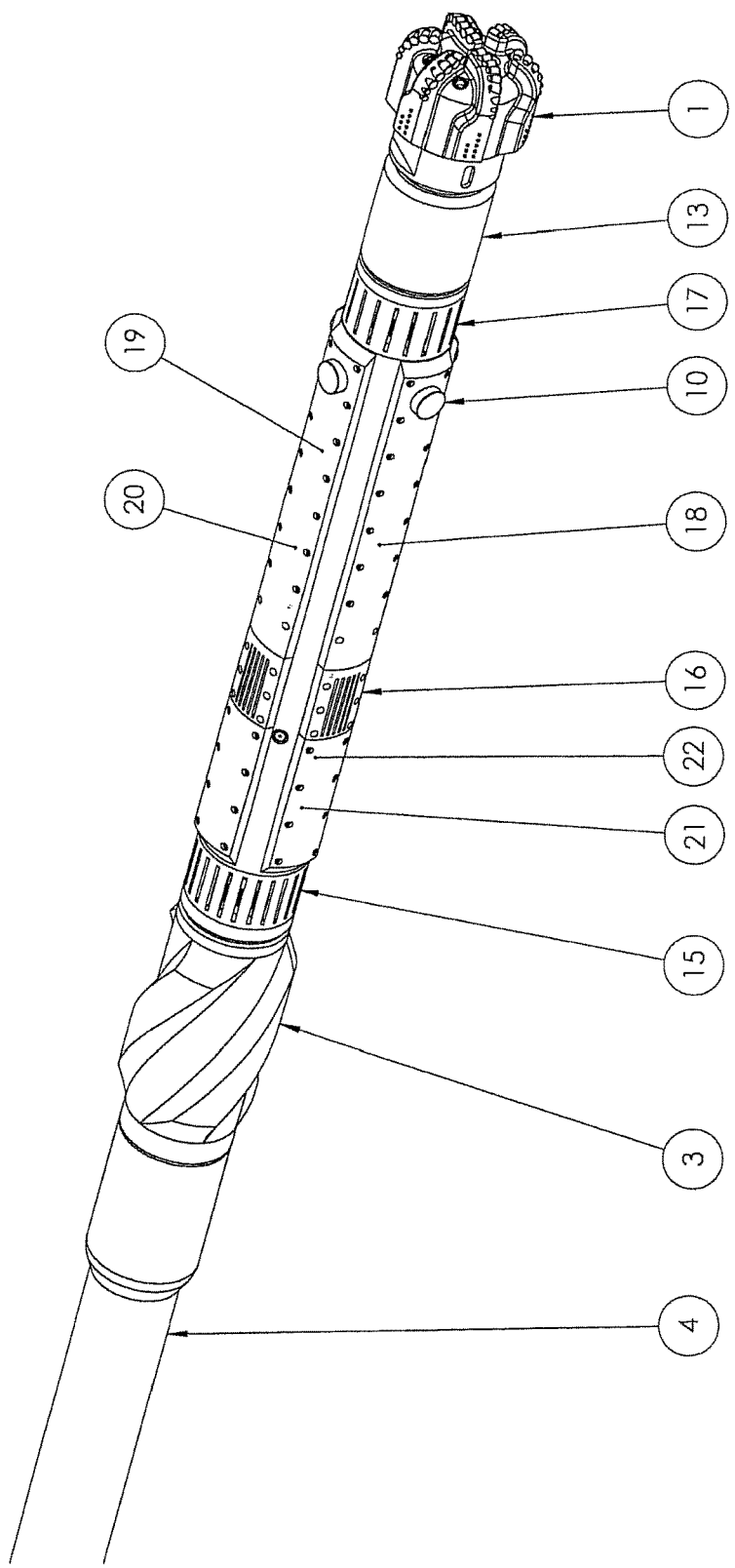
FIG. 4a illustrates an enlarged perspective view of the improved rotary steerable system of FIG. 3.
Figure 4B:
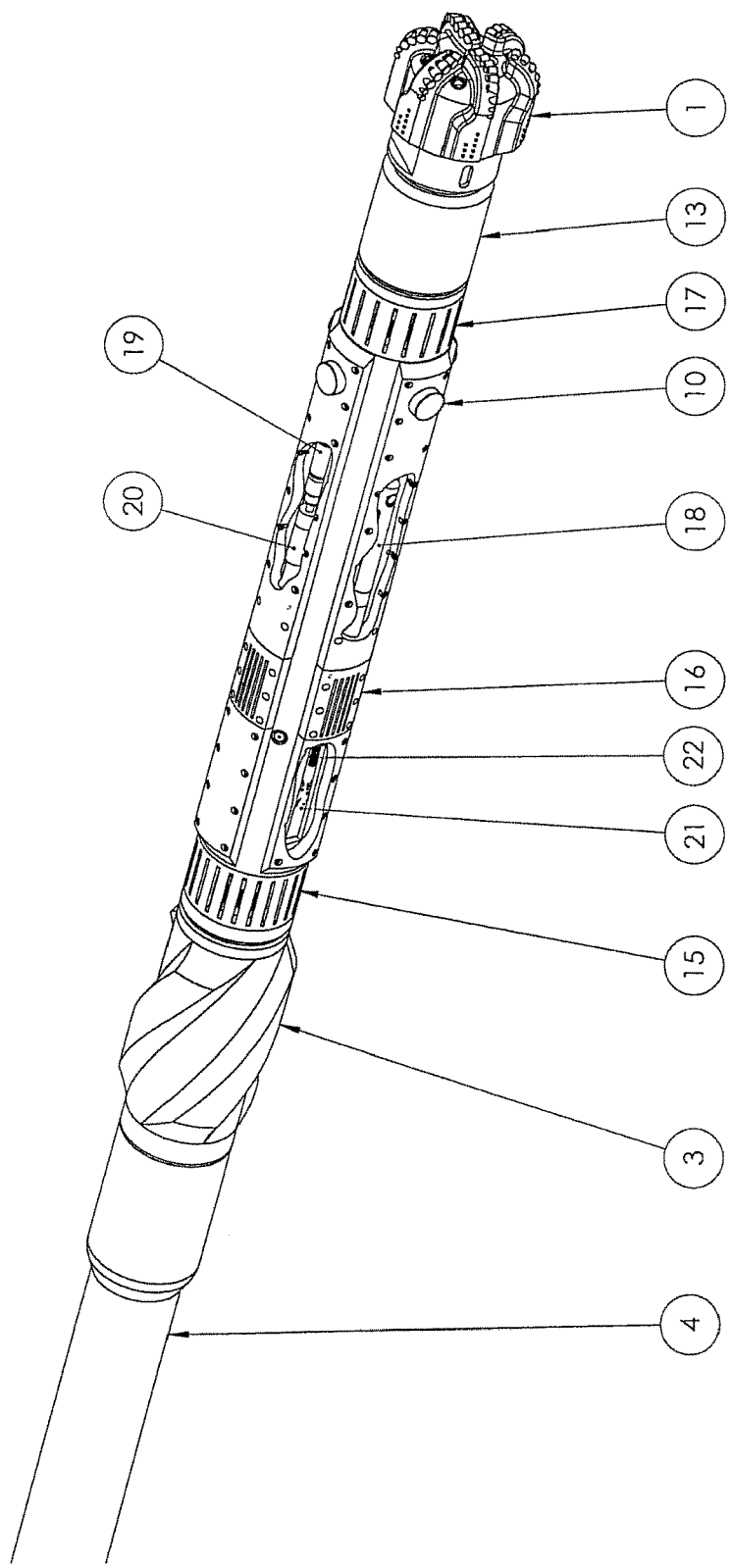
Figure 5A:
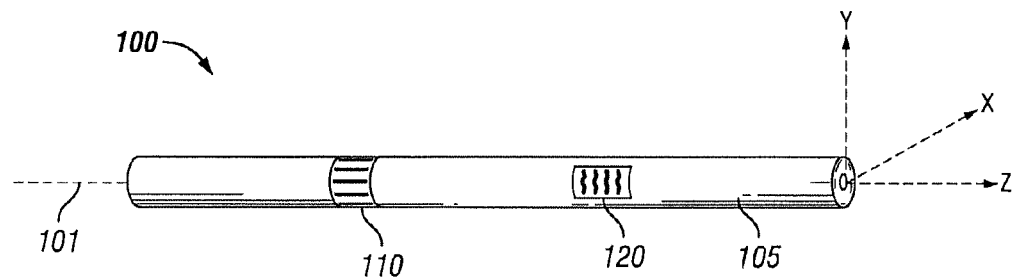
FIGS. 5A-5C illustrate embodiments of azimuthal resistivity measurement antennas having a transverse elemental antenna.
Figure 5B:
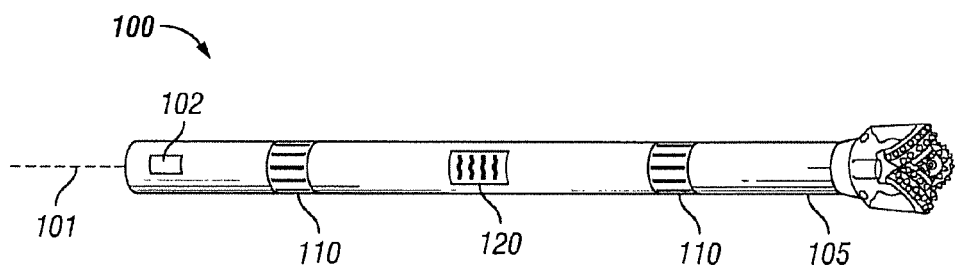
Figure 5C:
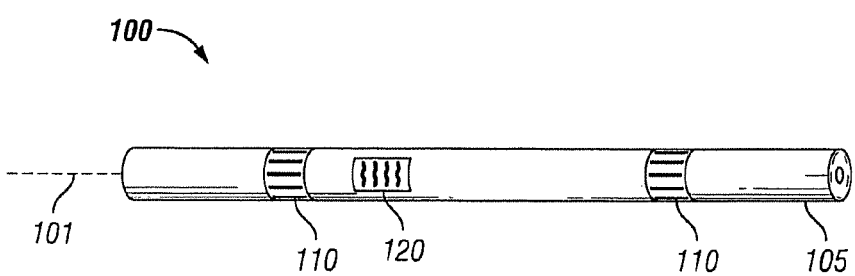

FIG. 3 illustrates a perspective view of an embodiment of a system with an improved boundary tracking control module disposed in a rotary steerable system. The rotary steerable system may include a drill bit (1) of any type, the RSS housing or section (14) having the boundary tracking control module within, a stabilizer (3) of any type, a pulser/battery/electromagnetic ("EM") transmitter (4), a mud motor (5) of any type, and a measurement-while-drilling ("MWD") tool (6) of any type, and other components such as drill pipe or drill collars shown in FIG. 1 disposed above. FIGS. 4a and 4b illustrate, respectively, a perspective view and cutaway view of an embodiment of an improved RSS (14). The RSS housing (14) includes hydraulic rams (10) that are radially extendable inward and outward by a hydraulic pump (19) and pump drive (20)—both enclosed within RSS (14)—to press against the wellbore thereby causing the drill bit (1) to press on the opposite side of the wellbore and cause a direction change, i.e., "push-the-bit".

The RSS housing (14) is disposed between the drill bit (1) and the stabilizer (3). In certain embodiments, the RSS (14) does not rotate at all, i.e., zero (0) revolutions per hour. In other embodiments, the RSS (14) may be "non-rotating", which includes not rotating at all, but also includes rotating very slowly. For example, "non-rotating", as used herein, may include rotating at less than five (5) revolutions per hour, or less than ten (10) revolutions per hour, or less than fifteen (15) revolutions per hour, or less than twenty (20) revolutions per hour, or less than twenty five (25) revolutions per hour, or less than thirty (30) revolutions per hour, or less than forty (40) revolutions per hour. "Non-rotating" may also include rotating much slower relative to "rotating" components, such as the drill bit, stabilizer, drill pipe, and others. "Rotating", as used herein, for components from the surface down to the mud motor may include rotating at or greater than 1,000 revolutions per hour, or greater than 1,500 revolutions per hour, or greater than 2,000 revolutions per hour, or greater than 3,000 revolutions per hour, or greater than 4,000 revolutions per hour, or greater than 5,000 revolutions per hour, or greater than 6,000 revolutions per hour. "Rotating", as used herein, for components from the mud motor down to the drill bit, e.g., stabilizer and drill bit, may include rotating at greater than 15,000 revolutions per hour, or greater than 20,000 revolutions per hour, or greater than 25,000 revolutions per hour, or greater than 30,000 revolutions per hour.

The RSS housing (14) encloses azimuthal resistivity measurement antennas (15), (16), and (17), which though illustrated in a particular arrangement with three shown, may be transmitting or receiving antennas in any number, e.g., greater than or less than three, and in any antenna placement or arrangement. The azimuthal resistivity antennas (15)-(17) are configured to provide imaging capabilities of the surrounding formation without rotating. For example, azimuthal resistivity antennas capable of imaging without rotating may be those described in U.S. Pat. No. 9,767,153, U.S. Pat. No. 9,645,276, U.S. Pat. No. 9,268,053, and U.S. Publication No. 2017/0371063, all of which are assigned to the same assignee, and hereby incorporated herein by reference in their entireties.

Azimuthal resistivity measurement antennas use an electric coil to generate an alternating current loop in the formation by induction. The alternating current loop, in turn, induces a voltage signal in a receiving coil located elsewhere in the tool. The voltage signal induced in the receiving coil is related to a parameter of the formation. Multiple transmitting and receiving coils may be used to focus formation current loops both radially (depth of investigation) and axially (vertical resolution).

As used herein in reference to antennas, "transverse" refers to a magnetic moment, created by electrical current in a wire loop, having a direction orthogonal or substantially orthogonal relative to a longitudinal axis of the tool body. "Axial" refers to a magnetic moment, created by electrical current in a wire loop, having a direction aligned or substantially aligned or parallel with a longitudinal axis of the tool body.

For frame of reference and as used herein, the Z-axis points along a longitudinal axis of the tool body. The X-axis falls in a gravity plane containing the Z-axis. In a tool including transmitter and receiver antennas oriented in the X, Y, or Z directions, nine different combinations of transmitter and receiver antennas are possible: XX, XY, XZ, YX, YY, YZ, ZX, ZY, and ZZ, where the first letter indicates the orientation of the transmitter antenna and the second letter the orientation of the receiver antenna. Those combinations provide means to image the formation around a borehole. In particular, the XZ, ZX, YZ, and ZY components or their combinations provide the most useful azimuthal resistivity measurement for resolving an adjacent boundary or other geological features around a wellbore.

Figure 6A:
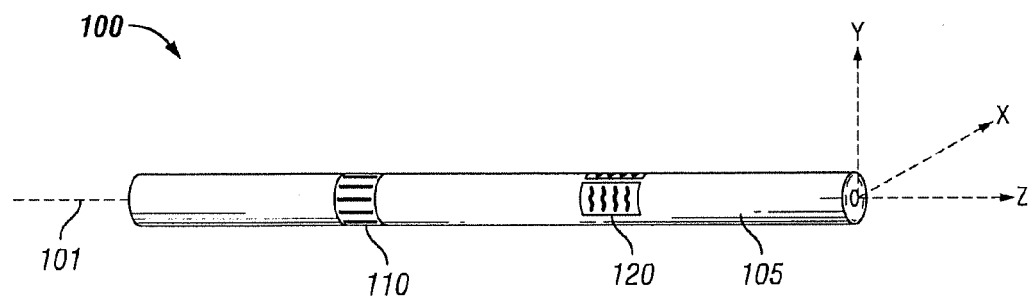
FIGS. 6A-6B illustrate embodiments of azimuthal resistivity measurement antennas having multiple azimuthally-spaced transverse elemental antennas.
Figure 6B:
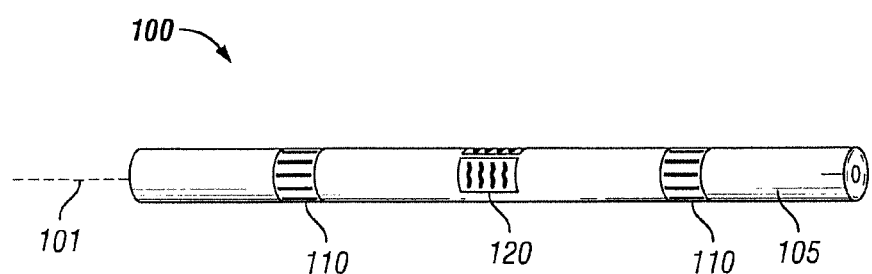

FIGS. 6A-6C illustrate embodiments of tool body 100 including a transverse receiving antenna 120 and an axial transmitting antenna 110. The axial transmitting antenna 110 may be placed in either the uphole direction or the downhole direction relative to the transverse receiving antenna 120. The receiving antenna 120 is spaced apart from the transmitting antenna 110 at a predefined distance. The direction of the magnetic moment of the axial transmitting antenna 110 remains substantially unchanged as the measurement tool 100 rotates, whereas that of the transverse receiving antenna 120 rotates with the tool 100. To make an azimuthal measurement, a current (e.g., alternating) is driven to the axial transmitting antenna 110 (also known as firing the antenna) at moments controlled by a microcontroller (not shown) of the tool to transmit electromagnetic waves into the surrounding medium at a selected frequency. The transmitted signal, when encountering a resistivity boundary near the borehole, is reflected back and received by the transverse receiving antenna 120. The detected voltage signal is recorded at one or more tool face angles as the tool rotates. The measurement tool includes a sensor 102 configured to measure the angular position of the tool body relative to the wellbore (e.g., tool face angles). For example, the sensor 102 may be an accelerometer, a magnetometer, a gyro, or any other known sensor or sensor combination. If multiple transverse receiving antennas are used, the reflected electromagnetic wave may be detected simultaneously by the receiving antennas.

FIGS. 6B and 6C illustrate embodiments of a resistivity measuring tool 100 including a transverse receiving antenna 120 and a pair of symmetrical (FIG. 1B) or asymmetrical (FIG. 1C) axial transmitting antennas 110. The pair of axial transmitting antennas 110 may be energized sequentially or simultaneously as explained later. And as further discussed below, by combining and processing the signals due to the two axial transmitting antennas, whether fired sequentially or simultaneously, a formation resistivity anisotropy effect on the azimuthal measurement may be reduced or removed, leaving the processed response largely sensitive to an adjacent bed boundary. Alternatively, the signals generated by the two axial transmitting antennas 110 may be processed to remove or reduce the bed boundary effect and enhance the formation resistivity anisotropy effect.

FIGS. 7A and 7B illustrate an embodiment of a resistivity measuring tool 100. Multiple transverse receiving antennas 120 are located around a circumference of the tool body 105 and separated by varying angles in the azimuthal direction, preferably 90 degrees in the azimuthal direction, although a different separation angle may also be used. For example, in certain embodiments, two transverse antennas may be separated by at least about 30 degrees, at least about 45 degrees, or at least about 60 degrees. Transverse receiving antennas are preferably located at substantially the same longitudinal position (e.g., along the Z-axis) on the tool axis but may be located at different longitudinal positions as well. One or more axial transmitting antennas 110 are preferably placed longitudinally on opposite sides of the receiving antenna(s) 120, although they may also be placed on the same side of the receiving antenna(s) 120. When more than one axial transmitting antennas 110 are used, they may be fired sequentially or simultaneously. The measured signals due to the two transmitting antennas 110 may be processed to either remove or enhance the formation resistivity anisotropy effect, discussed in greater detail below. The resistivity measuring tool having multiple transverse receiving antennas azimuthally-spaced around the tool body may be more preferably used to measure formation resistivity when the tool is slowly rotating or not rotating.

FIG. 8 illustrates an embodiment of transverse antenna components. An antenna pocket 122 is formed (e.g., machined, molded, etc.) near an outer surface of a drill collar body 105. The pocket 122 extends radially inward from the outer surface of the drill collar body to a maximum radial depth of one half a diameter of the tool body. Preferably, the pocket may be at least 0.25 inches deep, or up to 0.5 inches deep, or up to about one inch deep, or deeper. The pocket 122 may be any shape including square, rectangle, circle, ellipse or other shapes. In the case of a square or rectangle pocket, the corners of the pocket may be smoothed to reduce stress accumulation around the corners. An antenna body 124 is configured to substantially correspond in shape with and to fit within the pocket 122. The antenna body 124 may be made of any non-conducting material, including but not limited to as PEEK, fiberglass, or ceramic. An antenna wire 126 is wound around the antenna body 124 such that the wire 126 extends substantially along the longitudinal direction (Z-axis) of the tool axis 101. One or multiple turns of wire may be wound around the antenna body 124. To help hold the wire in place, wire grooves 125 may be formed on the outer surface of the antenna body 124. The wire 126 may be insulated with Teflon or other non-conducting material to prevent short-circuiting between turns and from being exposed to drilling fluids. The antenna body 126 with the wound antenna wire 125 is inserted into the antenna pocket 122 such that the moment of the antenna points in a transversal direction. The ends of the antenna wire 125 exit the antenna pocket 122 to a nearby pocket (not shown) formed in the collar body 105 where a preamplifier may be placed to amplify the received signal before the signal is fed to an electronic board (not shown).

An antenna shield 128 may be placed over the antenna body 124 after it is inserted within the antenna pocket 122. Preferably, the antenna shield is configured to sit flush with an outer surface of the collar body 105. The antenna shield 128 may be made of the same material as the collar body 105, or a different, preferably harder, material. In one embodiment, the antenna shield and collar body may be made of stellite. One or more openings 130 may be formed in the antenna shield 128 to allow electromagnetic energy to pass through. The openings 130 are preferably aligned in the azimuthal direction. The antenna shield 128 may be attached to the collar body 105 either with bolts or by welding or other means.

Non-conducting, abrasion-resistant materials, or potting material, may be used to fill any remaining voids or cavities within the antenna pocket 122, after the antenna body 124 is inserted and the antenna shield 128 is attached, for further protection of the antenna wire 126. To increase the antenna efficiency, the potting material may be mixed with magnetic materials so that the mixture has a relative magnetic permeability greater than 1. Such a transversal antenna may be referred to as an "elemental" transverse antenna. Because the shield openings extend substantially along the circumferential direction, they may be subject to wear and tear during drilling. To help protect the potting material from being damaged or worn out, the shield openings may be narrow. To further protect the potting material, curved openings may be used instead of straight openings. Each curved opening is preferably symmetric with respect to the center point of the opening.

FIGS. 9A-9D illustrate cross-section views of a collar body 105 having a pair of transverse elemental antennas 120 combined to form a composite transverse antenna. Any number of composite transverse antenna configurations may be formed. FIG. 4A illustrates an antenna body 124 and antenna wire winding 126 within a pocket 122 and covered by an antenna shield 128, forming a transverse elemental antenna 120. Current "I" flows in the antenna wire winding 126 in a direction shown by the arrows to generate a transverse magnetic moment $M_T$ substantially orthogonal to the tool body axis. FIG. 4B illustrates a pair of transverse elemental antennas 120 disposed opposite each other on the collar body 105 and connected to form a composite transverse antenna. The transverse elemental antennas 120 may be connected by a wire 121 of any diameter that extends from one transverse antenna to the other. The connecting wire 121 may be disposed within the collar body 105 for damage protection, for example, extending through a drilled hole in the collar body 105 starting from one transverse elemental antenna 120 and ending at the second transverse elemental antenna 120. Alternatively, a groove may be machined on an outer surface of the collar body 105, the wire 121 disposed within the groove running between the two transverse antennas, and the groove welded for mechanical protection. Yet other means of wire connection between two transverse elemental antennas are possible. For instance, the wire from each transverse elemental antenna may exit directly to an adjacent electronics board for signal communication. In this case, the pair of transverse elemental antennas may be connected indirectly through the electronics board. The pair of transverse elemental antennas 120 may be connected or coupled in different ways to generate different combinations of transverse magnetic moments.

Figure 9:
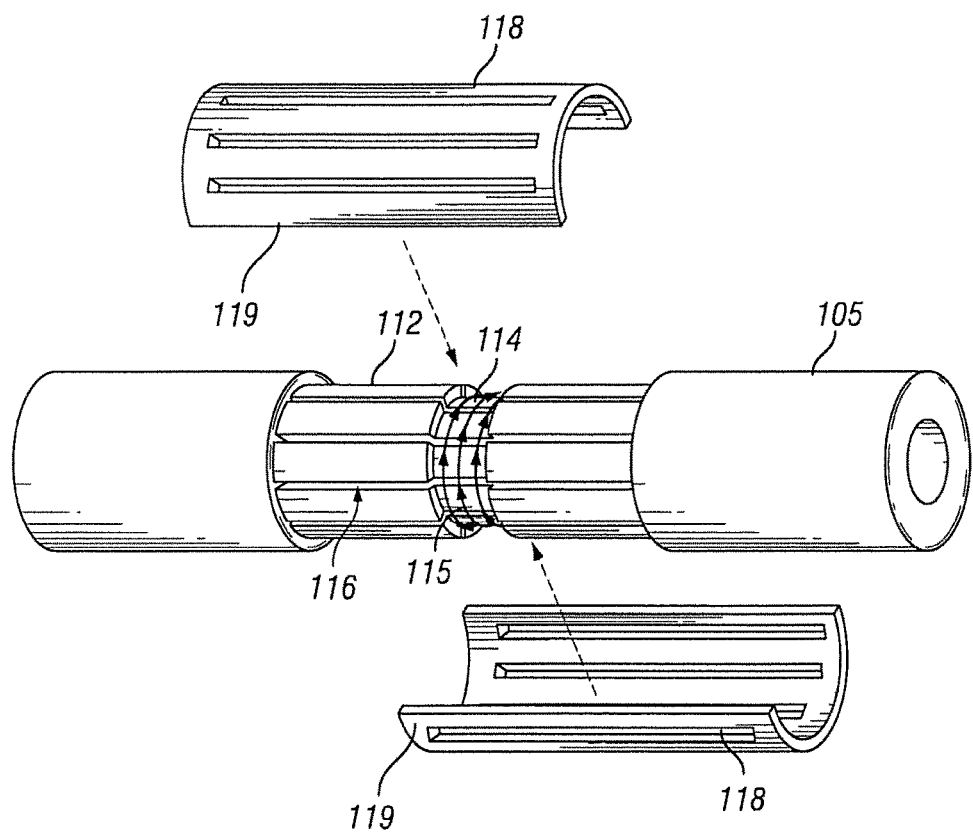
FIG. 9 illustrates an embodiment of axial antenna components.

FIG. 9B illustrates transverse elemental antennas 120, with currents I flowing in the antenna wire windings 126 in directions shown by the arrows, which generate transverse magnetic moments $M_T$ in the same transverse direction. In this configuration, the transverse antenna moments $M_T$ may be additive to each other and the pair of transverse antennas 120 produce a composite transversal antenna with its effective center on the tool axis. That is, the pair of elemental antennas shown in FIG. 4B are connected in series so that signals from each are added to form a stronger signal (e.g., a composite transverse moment=$2M_T$).

FIG. 9C illustrates transverse elemental antennas 120, with currents I flowing in the antenna wire windings 126 in direction shown by the arrows, which generate transverse magnetic moments $M_T$ in opposite transverse directions. A composite transverse antenna in this configuration will not produce any significant transverse magnetic moment component (e.g., a composite transverse moment≈0). Rather, the resulting magnetic moments may resemble a quadrupole. An electrical current flowing in the tool's longitudinal direction will produce a magnetic field circulating around the collar. The magnetic fields on the opposite sides of the collar will point to opposite azimuthal directions when viewed in a Cartesian coordinate system, which will produce a response in the quadrupole antenna.

FIG. 9D illustrates transverse elemental antennas 120, with currents I flowing in the antenna wire windings 126 in directions shown by the arrows, which generate transverse magnetic moments $M_T$ in the same transverse direction, similar to FIG. 4B. However, the antennas shown in FIG. 4D are electrically connected in parallel. Therefore, transverse magnetic moments $M_T$ are not added (e.g., a composite transverse moment=$M_T$), however if one antenna fails the other still provides the same signal strength. That is, transverse elemental antennas electrically connected in parallel provide redundancy in case one antenna fails, the composite antenna will still have the same moment as if there was no failure.

Figure 10A:
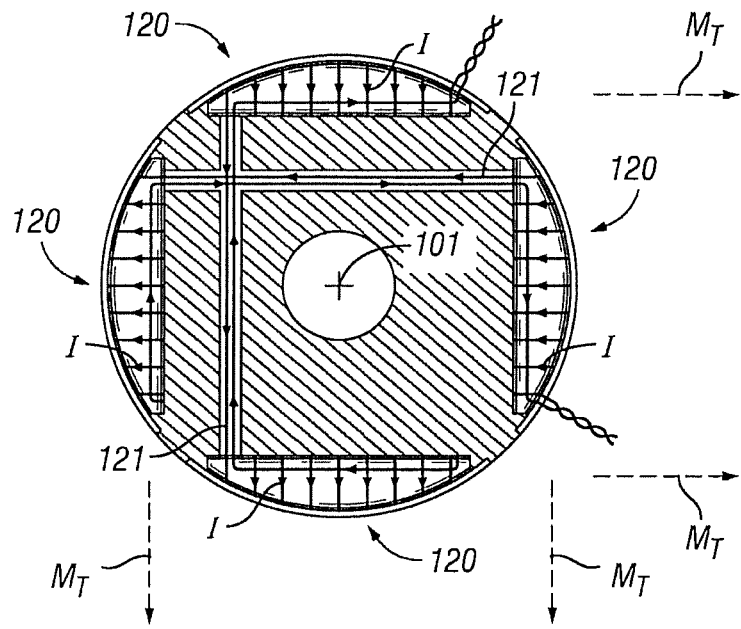
FIGS. 10A-10C illustrate embodiments of co-located antennas.
Figure 10B:
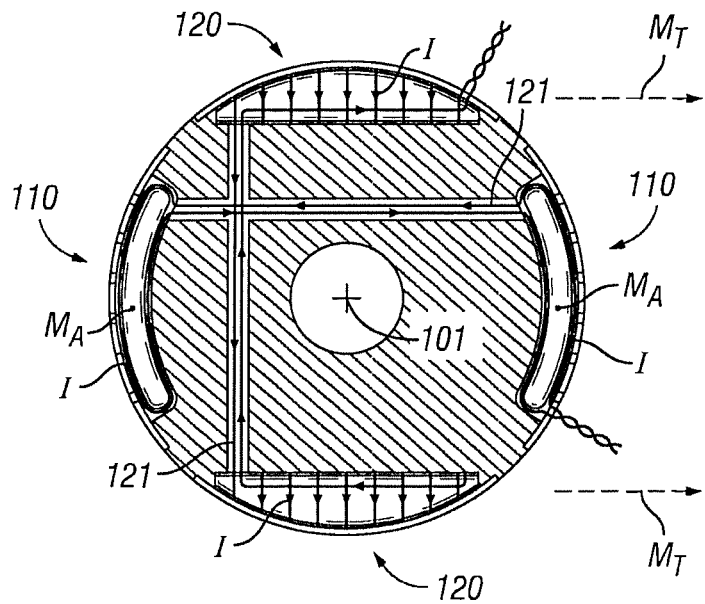
Figure 10C:
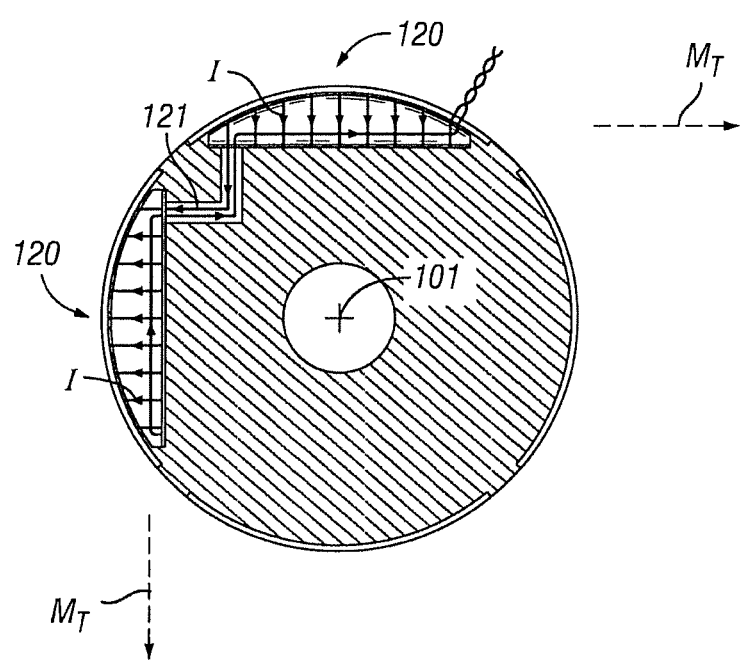

FIG. 10 illustrates an embodiment of axial antenna components. An antenna groove 112 may be formed in an outer surface of the tool body 105. The width of the antenna groove 112 may be at least one-half inch or up to eight inches or greater, but preferably between one inch and six inches measured along the longitudinal direction of the collar. A depth of the antenna groove 112 may be at least 0.05 inches, at least 0.1 inches, at least 0.25 inches, at least 0.5 inches, at least one inch, or greater. A wire groove 114 may be formed in an outer surface and near the center of the antenna groove 112. The wire groove 114 should be wide and deep enough to hold one or multiple turns of antenna wire 115. Individual wire ways may also be created to hold each turn of wire in place. Longitudinal slots 116 may be formed in an outer surface of the antenna groove 112 for passage of electromagnetic wave energy, and may be referred to as passage slots. The passage slots 116 may be at least 0.25 inches deep, or at least 0.5 inches deep, or at least one inch deep, depending on the size of the collar. The passage slots 116 may be separated from each other by at least approximately 0.25 inches, or at least 0.5 inches, or at least one inch, or at least two inches, or greater. One or multiple turns of antenna wire 115 may be disposed in the wire groove 114. The antenna wire 115 may exit the antenna groove through pressure sealed connectors to a pressure-sealed pocket (not shown) near the antenna groove 112.

An antenna shield 118 may be placed on top of the antenna groove 112 to cover the antenna wire. The antenna shield 118 may be made of the same material as the collar body 105 or a different, preferably harder, material (e.g., stellite) to protect the antenna wire from being damaged during drilling. The antenna shield 118 may include two or more cylindrical pieces, each having multiple slots 119 formed within. The shield slots 119 may be aligned with the passage slots 116 formed in the antenna groove 112. The shield slots 119 may be at least 0.05 inches wide, or at least 0.1 inches wide, or at least 0.5 inches wide, or at least one inch wide, but are preferably within 0.1 to 0.5 inches wide and do not have to be the same width as the underneath passage slots. The thickness of the shield may be at least 0.05 inches, or at least 0.1 inch, or at least 0.25 inches, or at least 0.5 inches, or at least one inch, or greater. The shield 118 may be secured or locked to the collar body 105 either through welding or by bolts. Further, the antenna body may be vacuumed and potted with non-conducting material for integrity and damage protection. The surface of the antenna may be polished to remove any outstanding material.

FIGS. 11A-11C illustrate embodiments of co-located antennas in the drill collar body. FIG. 6A illustrates an embodiment of co-located transverse antennas, each including a pair of transverse elemental antennas 120 connected as discussed in reference to FIGS. 4A-D. The pairs of transverse antennas generate magnetic moments $M_T$ in the same direction, although any of the composite transverse antenna arrangements may be configured. Connecting wires 121 and wire ways between the pairs of transverse elemental antennas 120 preferably do not intercept, and each transverse elemental antenna 120 transmits or receives electromagnetic energy independently. FIG. 6B illustrates an embodiment of co-located transverse elemental antennas 120 and axial antennas 110. The pair of transverse antennas 120 generate magnetic moments $M_T$ in the same direction, although any of the composite transverse antenna arrangements may be configured. The pair of axial antennas 110 generate magnetic moments $M_A$ in either direction. The axial antenna 110 includes two axial elemental antennas spaced apart by 180 degrees in the azimuthal direction and connected by a wire way for wire passage 121. The wire ways preferably do not intercept each other. In certain instances, the axial antenna may include a single axial antenna, in which case no wire way will be needed.

Various methods of making azimuthal resistivity measurements with and without tool rotation are disclosed. One purpose of azimuthal resistivity measurements is generating information for resolution of the azimuthal direction of and distance to an adjacent boundary near the wellbore. This may be accomplished with one axial transmitting antenna and one elemental transversal receiving antenna. While the transmitting antenna is firing, a signal is acquired from the receiving antenna as the tool rotates. In the presence of a bed boundary near the wellbore and assuming that the boundary is azimuthally located at a tool face angle of $\phi_0$, the signal measured will vary with tool face angle as:

$$A(\phi) = A_0 \cos(\phi + \phi_0) \quad (1)$$

where $A_0$ is the maximum (in the absolute value) value of the azimuthal signal when the transversal receiver antenna points toward the boundary, i.e., at the tool face angle $\phi_0$ and $\phi$ is tool face angle. In equation (1), $A_0$ depends on the resistivities of both the near and the remote beds, distance to the boundary, coil spacing, frequency, antenna moments, and the driving current in the transmitting antenna. Solving equation (1) for $A_0$ and $\phi_0$ requires at least two independent measurements, which may be accomplished by taking measurements at two or more distinct tool face angles. It may be expressed as:

$$A_1 = A_0 \cos(\phi_1 + \phi_0) + e_1 \quad (2)$$

$$A_2 = A_0 \cos(\phi_2 + \phi_0) + e_2 \quad (3)$$

$$\ldots$$

$$A_n = A_0 \cos(\phi_n + \phi_0) + e_n \quad (4)$$

In equations (2)-(4), $e_1, e_2, \ldots e_n$ are measurement errors, and the equations may be solved in the least-square sense which is well known.

In the case where the tool does not rotate, multiple transverse antennas are used to generate independent measurements at different tool face angles. For example, two transverse elemental antennas separated by 90 degrees in the azimuthal direction, may be used. They are preferably located at the same longitudinal position on the tool axis but this is not necessary. Measurements from each antenna may be written as:

$$A_1 = A_0 \cos(\phi_1 + \phi_0) + e_1 \quad (5)$$

$$A_2 = A_0 \cos(\phi_1 + 90 + \phi_0) + e_2 = A_0 \sin(\phi_1 + \phi_0) + e_2 \quad (6)$$

Equations (5)-(6) may be solved for $A_0$ and $\phi_0$ using a least squares methods. Here, in a cross-section view, the magnetic moments generated by the two transversal antennas are assumed to be orthogonal to each other, although not necessary. In general, the two transverse elemental antennas may be separated in the azimuthal direction by any angle between 0° and 360°. In this case, equations (5)-(6) becomes:

$$A_1 = A_0 \cos(\phi_1 + \phi_0) + e_1 \quad (7)$$

$$A_2 = A_0 \cos(\phi_1 + \Delta\phi + \phi_0) + e_2 \quad (8)$$

where $\Delta\phi$ is the azimuthal angle separation between the two antennas.

For the special case of equations (5)-(6) and in the absence of measurement noises, both $A_0$ and $\phi_0$ may be computed as:

$$A_0 = (A_1^2 + A_2^2)^{1/2} \quad (9)$$

$$\phi_0 = \tan^{-1}\left(\frac{A_2}{A_1}\right) \quad (10)$$

For the general case of equations (7)-(8), inversion must be applied to compute $A_0$ and $\phi_0$.

If multiple transverse elemental antennas are used that are located at substantially the same longitudinal position on the tool axis, it is possible to form a virtual transversal antenna by combining the multiple transversal antennas. The combination may be done either by electrically connecting the antennas together or by adding their responses together, examples of which were discussed in reference to FIGS. 4A-D. For instance, if two transverse elemental antennas are separated by an azimuthal angle $\Delta\phi$, then their combined response:

$$A = A_1 \cos(\phi + \phi_0) + A_2 \cos(\phi + \Delta\phi + \phi_0) = B \cos(\phi + \phi') \quad (11)$$

is another cosine function of the tool face angle. In the above, $$B = (A_1^2 + A_2^2 + 2A_1 A_2 \cos\Delta\phi)^{1/2} \quad (12)$$

$$\phi' = \tan^{-1}\left(\frac{A_1 \sin\phi_0 + A_2 \sin(\phi_0 + \Delta\phi)}{A_1 \cos\phi_0 + A_2 \cos(\phi_0 + \Delta\phi)}\right) \quad (13)$$

Advantageously, combined antennas or signals over individual antennas or signals may lead to better noise rejection and improved signal-to-noise ratios. And, if one of the antennas fails, the combined signal will still be usable.

Signals from multiple transverse elemental receiving antennas may be acquired simultaneously when a transmitting antenna fires. The signals may also be acquired sequentially as a transmitting antenna fires, regardless of tool rotation. The tool face angle will be recorded by a sensor while recording the signals. The signals are associated with the tool face measurements in computing a formation parameter of interest. When the tool rotates, measurements from two transverse (e.g., X and Y) elemental receiving antennas as a function of tool face angle will resemble each other, which provides data redundancy. Combining a larger set of measurements may be used for subsequent processing and interpretation, while independently processing measurements from each transverse elemental antenna may be used for quality control purposes, among others.

Cross-component antenna arrangements (e.g., an axial transmitting antenna and a transverse elemental receiving antenna) disclosed herein may be used for making azimuthal resistivity measurements for detection and resolution of an adjacent bed boundary in a formation. However, detection and resolution of adjacent bed boundaries using such cross-component antenna arrangements may oftentimes be affected by formation resistivity anisotropy (e.g., directionally dependent formation properties). That is, formation resistivity anisotropy may produce an anomalous signal similar to that produced by an adjacent bed boundary. The cross-component response to an anisotropic formation may be written as:

$$V_{zx} = \frac{M_T M_R I}{4\pi L^3}\left[\frac{\cos\theta}{\sin\theta} i k_h L (e^{ik_h L} - e^{ik_h \beta L})\right] \quad (14)$$

Where:

$$k_h = (i\omega\mu\sigma_h)^{1/2} \quad (15)$$

$$\beta = \left(\cos^2\theta + \frac{R_h}{R_v}\sin^2\theta\right)^{1/2}$$

In the above equation, $M_T$ and $M_R$ are the effective areas of the transmitting and receiving antennas, respectively, I is the driving current in the transmitting antenna, and $\theta$ is the relative dip angle of the formation relative to the tool axis. If the resistivity anisotropy is produced by lamination of thin beds of different resistivity values, the relative dip angle $\theta$ will be 90 degrees if the wellbore (or tool axis) is parallel to the bedding planes. $V_{zx}$ will be nonzero as long as the relative dip angle $\theta$ is different from 0 or 90 degrees. As determined from equation (14), the cross-component signal $V_{zx}$ will remain the same if the relative dip angle changes by 180 degrees. Therefore, an axial transmitting antenna located longitudinally on one side of the receiving antenna will produce the same response as if the transmitting antenna is moved to the other side of the receiving antenna at a symmetrical position and driven with the same driving current. Hence, a signal response due to an anisotropic formation may be removed by subtracting the responses generated by two longitudinally symmetrical transmitting antennas. In contrast, the responses produced at an adjacent bed boundary due to two longitudinally symmetrical transmitting antennas will have opposite signs if the axial magnetic moments of the transmitting antennas point in the same longitudinal direction. Hence, subtracting the two responses from each other will enhance the bed boundary response.

A method of data acquisition is disclosed for suppressing certain formation parameters while amplifying others, which includes firing two transmitting antennas at least substantially simultaneously. Currents may be driven simultaneously to two transmitting antennas for generating axial magnetic moments in opposite directions, thereby inducing a voltage signal in the wire winding of the receiving antenna related to a parameter of an adjacent formation bed boundary (and reducing or cancelling the formation resistivity anisotropy effect). Alternatively, currents may be driven simultaneously to two transmitting antennas for generating axial magnetic moments in the same direction, thereby inducing a voltage signal in the wire winding of the receiving antenna related to a parameter of formation resistivity anisotropy (and reducing or cancelling the bed boundary effect).

Simultaneously driving currents to the two transmitting antennas produces a stronger signal and greater signal-to-noise ratio (SNR) than sequentially driving currents to transmitting antennas at the same power input. As an example, for total data acquisition time of T, and $V_0$ indicating the voltage signal detected by a receiving antenna for a unit driving current in a is transmitting antenna, the power consumption by the transmitting antenna may be written as:

$$P = I^2 R \tag{16}$$

where R is the total resistance of the antenna, i.e., the sum of the antenna wire resistance and the antenna radiation resistance. Noise in the received signal may be assumed to be random and stacking of data will result in reduction in noise according to:

$$n = c n_0 / \sqrt{t} \tag{17}$$

where $n_0$ is the noise level without any stacking, t is the acquisition time, and c is a proportionality constant. For sequential acquisition, the signal level is calculated by:

$$V_1 = V_0 \sqrt{\frac{P}{R}} \tag{18}$$

Combining the two sequential measurements will result in a signal-to-noise (SNR) ratio for the combined signal calculated by:

$$SNR_1 = \frac{V_0 \sqrt{PT/R}}{c n_0} \tag{19}$$

Similarly, for simultaneous acquisition, the total signal level is calculated by:

$$V_1 = V_0 \sqrt{\frac{2P}{R}} \tag{20}$$

The corresponding SNR is calculated by:

$$SNR_2 = \frac{V_0 \sqrt{2PT/R}}{c n_0} = \sqrt{2} \, SNR_1 \tag{21}$$

As shown, the SNR for simultaneous acquisition is increased by a factor of $\sqrt{2}$ over sequential acquisition for the same input power. After binning the measurements made at multiple tool face angles into a number of sectors, the SNR for each sector will be less than that for the entire data combined. However, the relative gain in the SNR for each sector with simultaneous acquisition will remain the same as compared to sequential acquisition. In simultaneous acquisition, the two antennas preferably have the same effective cross-sectional area and are driven with currents of the same magnitude. If they have different effective cross-sectional areas, the driving currents then must be adjusted such that the products of the effective cross-sectional area and the driving current are the same.

Figure 7:
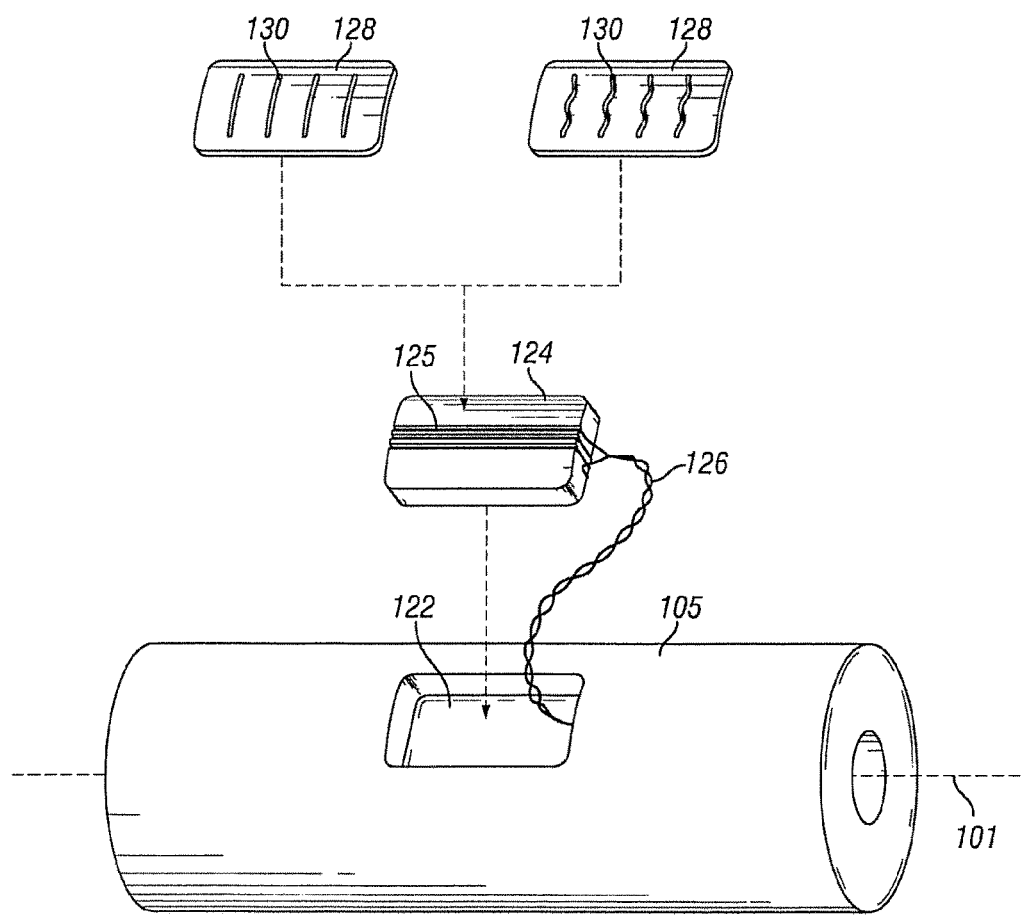
FIG. 7 illustrates an embodiment of transverse elemental antenna components.
Figure 8A:
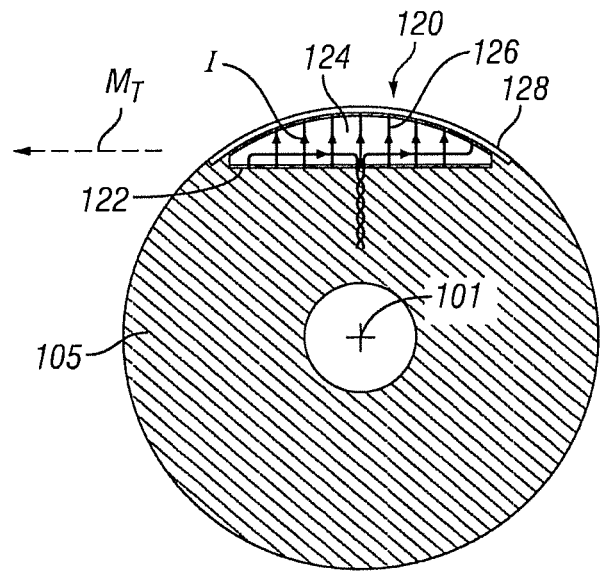
FIGS. 8A-8D illustrate embodiments of composite transverse antenna configurations.
Figure 8B:
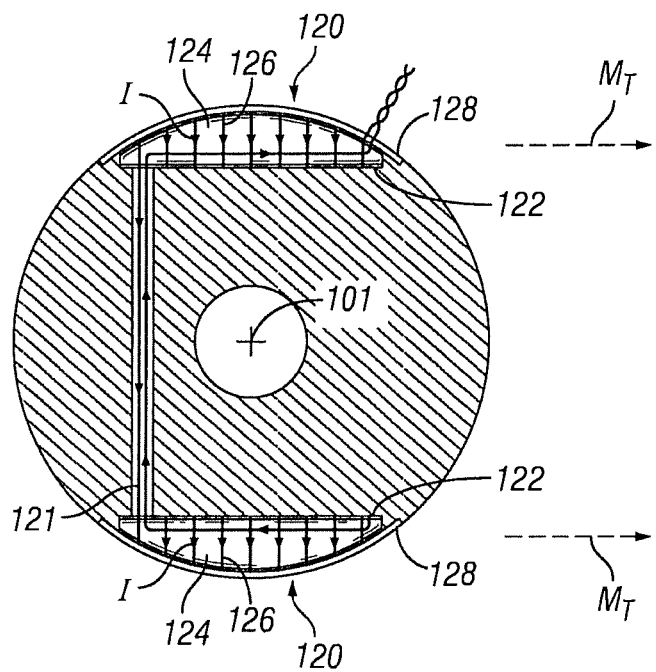
Figure 8C:
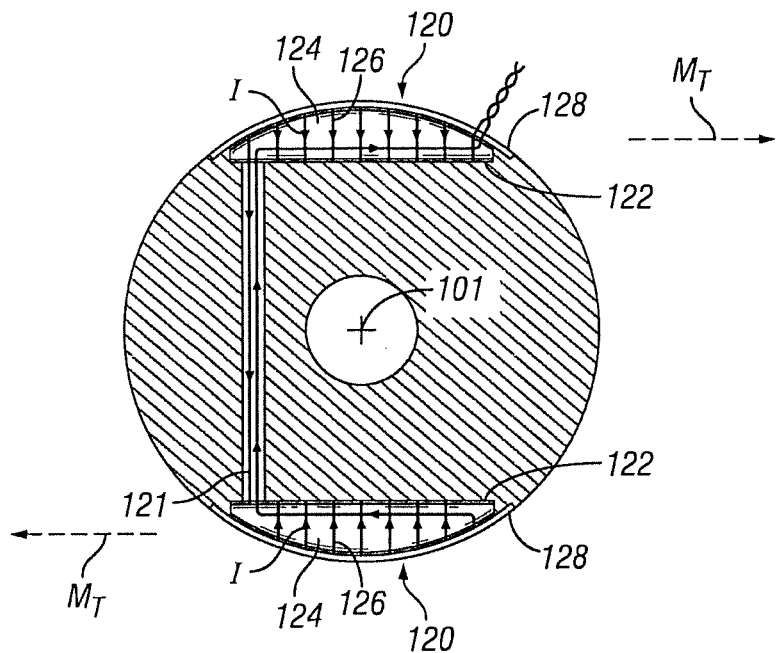
Figure 8D:
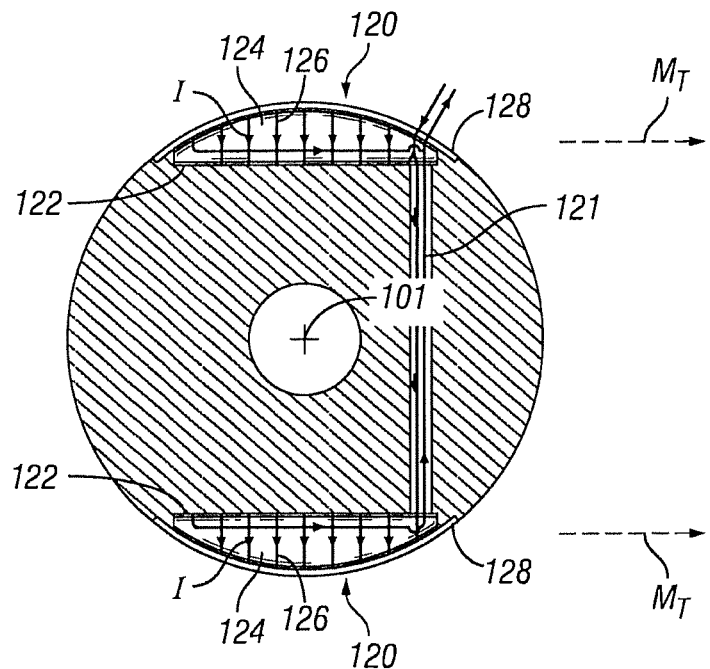

In the above discussion, the two transmitting antennas are substantially equally spaced apart from the receiving antenna(s). In instances where the two transmitting antennas have different spacings from the receiving antenna(s), additional methods for compensating for formation anisotropy effect are disclosed. In a first method, the two signals may be measured, with either sequential data acquisition or simultaneous data acquisition, and subtracted. Subtracting the signals may work if the coil spacing is small. As an example, coil spacing may be less than ten inches or less than twenty inches. In other examples, coil spacing may be twenty inches or greater. FIG. 7 illustrates a graph 700 showing signal responses due to an anisotropic formation, an uncompensated signal response 702 and compensated signal response 704 using the first method. The parameters are: Rh=1 ohmm, Rv=5 ohmm, θ=100°, $L_1$=40 in., $L_2$=38 in., and f=2 MHz. The compensated signal is defined as:

$$V_{zx}^{Comp} = \frac{1}{2}(V_{zx1} - V_{zx2}) \tag{22}$$

A coefficient of ½ is included so that after the compensation the bed boundary response remains the same (if the bed boundary is parallel to the tool axis). As shown, the first compensation method reduces the anisotropy effect by a factor of approximately 9.1, which represents a great reduction in the anisotropy effect.

In a second method, equation (22) is corrected by adjusting the scaling factor L (see equation (14)) to further compensate for the formation anisotropy effect. The two individual signals may be combined as follows to produce a new compensated signal:

$$V_{zx}^{Comp} = \frac{1}{L_1^3 + L_2^3}(V_{zx1} L_1^3 - V_{zx2} L_2^3) \tag{23}$$

As shown, equation (23) reduces to equation (22) if $L_1 = L_2$. FIG. 8 illustrates a graph 800 showing signal responses due to an anisotropic formation, an uncompensated signal response 802 and compensated signal response 804 using the second method according to equation (23). The second compensation method reduces the anisotropy effect by a factor of approximately 16.3, nearly doubling that of the first compensation method. Equation (23) may also be implemented for simultaneous data acquisition. To do so, the currents in the two transmitter antennas are scaled by factors of $L_1^3/(L_1^3+L_2^3)$ and $L_2^3/(L_1^3+L_2^3)$, respectively.

In a third method, the anisotropy effect is directly removed from signal measurements by numerically computing the anisotropy effect using equation (14). In the equation, the two unknown parameters Rh and β may be calculated from the propagation resistivity measurements. The relative dip angle θ must be input from other sources, e.g., the well deviation angle and the known formation dip angle.

Referring back to FIG. 4b, the RSS housing (14) also encloses an azimuthal resistivity measurement antenna electronics (21), also referred to herein as "measurement electronics." The measurement electronics (21) control and operate the azimuthal resistivity antennas (15)-(17) for making measurements of the surrounding formation, including measuring the distance to upper or lower formation boundaries. The RSS housing (14) also encloses azimuthal resistivity measurement antenna tuning electronics (22) that are configured to condition antenna signals to make sure the antennas are measuring properly, e.g., calibration.

The RSS housing (14) also encloses a control module (18). The control module (18) may be any type of microprocessor unit ("MPU") which incorporates the functions of all central processing for the rotary steerable system on a single integrated circuit ("IC"), or at most a few integrated circuits. The control module (18) may be a multipurpose, clock driven, register based, digital-integrated circuit which accepts binary data as input, processes it according to instructions stored in its memory, and provides results as output.

The control module (18) is configured to execute a pre-programmed well trajectory, e.g., a "well plan". For example, the control module (18) is configured to execute a pre-programmed well trajectory, which includes azimuth (or direction) and total vertical depth ("TVD"), which is referred to as a "geometric setting." In addition, the control module (18) is pre-programmed to maintain a certain or desired distance from a formation boundary above or below the rotary steerable system, which is referred to as a "boundary tracking setting." That is, the control module (18) is configured to control a vertical component of the three-dimensional well path to avoid exiting from the formation, or a desired portion of the formation, either through a top or bottom of the formation. To do so, the azimuthal measurement antennas (15)-(17) "track the boundaries" for the formation above or below. Upon detecting that the rotary steerable system is about to exit through a formation boundary, or is too close to a formation boundary (e.g., less than a certain or desired distance), the control module (18) corrects the rotary steerable system path.

Accordingly, once the geometric and boundary tracking settings are pre-programmed, the control module (18) acts autonomously in responding to the changing geology of a formation, much like a self-driving vehicle. As the rotary steerable system is travelling along a pre-programmed three-dimensional well path, the azimuthal resistivity measurement antennas (15)-(17) are measuring its distance from formation boundaries above or below, and based on the measurements, the control module (18) is determining whether correction up or down is needed to avoid exiting the formation. Thus, the control module (18) steers the rotary steerable system to stay within the producing formation and/or reach a pre-determined target or location in the formation.

Boundary tracking data may be based on a tool face ("TF") angle obtained by the control module (18). In certain embodiments, if the azimuthal resistivity measurement antennas (15)-(17) require their own tool face sampling, the tool face angle at the control module (18) may be corrected by entering an angle value for the radial offset between the control module (18) and the measurement electronics (21). The control module (18) is configured to measure TF angle and, if necessary, to make corrections to inclination or azimuth. The control module (18) is configured to communicate with the pulser/battery/electromagnetic ("EM") transmitter (4) and/or the MWD tool (6), In certain embodiments, the control module (18) and the measurement electronics (21) may be axially aligned to avoid making a tool face offset correction. For example, the control module (18) and the measurement electronics (21) may be hard mounted on the same platform within the non-rotating RSS (14) such that they are axially aligned.

Advantageously, embodiments disclosed herein provide a rotary steerable system that has a control module directly integrated inside the non-rotating rotary steerable housing for precisely steering the rotary steerable system through a formation and between boundaries. The housing has the azimuthal resistivity measurement antennas integrated therein and the control module measures the distance to the formation boundary (either upper or lower) and operates the antennas to operate autonomously and thereby maintain a certain distance from upper and lower boundaries of a formation. Further, measurements are performed right behind the bit for improved precision and accuracy. The control module eliminates the need for a logging-while-drilling ("LWD") string with separate azimuthal resistivity measurement tools, which considerably shortens the length of the RSS bottom hole assembly. Overall reliability of the rotary steerable bottom hole assembly.

One or more embodiments disclosed herein are for a rotary steerable bottom hole assembly comprising a drill bit disposed at a distal end thereof, a stabilizer disposed in the bottom hole assembly uphole from the drill bit, and a non-rotating steerable housing disposed between the stabilizer and the drill bit. The non-rotating steerable housing includes azimuthal resistivity antennas and electronics configured to measure a distance to an approaching formation boundary. The non-rotating steerable housing further includes a control module configured to steer the drill bit along a well path and, based on measurements from the azimuthal resistivity antennas, to steer the housing away from the approaching formation boundary and thereby maintain a certain distance between the steerable housing and upper or lower boundaries of a formation.

Embodiments disclosed herein may include a rotary steerable bottom hole assembly wherein the non-rotating housing further encloses a hydraulic pump and pump drive for operating one or more rams to steer the drill bit.

Embodiments disclosed herein may include a rotary steerable bottom hole assembly wherein the control module is configured to execute a pre-programmed well trajectory.

Embodiments disclosed herein may include may include a rotary steerable bottom hole assembly wherein the control module is configured to control a vertical component of the well path.

One or more embodiments disclosed herein may include a rotary steerable system comprising a non-rotating housing, azimuthal resistivity antennas and electronics, disposed within the non-rotating housing, configured to measure a distance to an approaching upper or lower formation boundary, and a control module configured to steer a drill bit along a well path and, based on measurements from the azimuthal resistivity antennas, to steer the housing away from the approaching upper or lower formation boundary and thereby maintain a certain distance between the steerable housing and upper or lower formation boundary.

Embodiments disclosed herein may include a rotary steerable system, further comprising a hydraulic pump and pump drive for operating one or more rams to steer the rotary steerable system.

Embodiments disclosed herein may include a rotary steerable system wherein the control module is configured to execute a pre-programmed well trajectory.

Embodiments disclosed herein may include a rotary steerable system wherein the non-rotating housing is disposed between the drill bit and a stabilizer.

Embodiments disclosed herein may include a rotary steerable system wherein the control module is configured to control a vertical component of the well path.

One or more embodiments disclosed herein may include a method of directional drilling comprising steering a drill bit along a well path by operating a rotary steerable system having a control module enclosed within a non-rotating steerable housing, measuring a distance between the steerable housing and a distance to an approaching upper or lower formation boundary with azimuthal resistivity antennas disposed within the non-rotating steerable housing, and steering the drill bit away from the approaching upper or lower formation boundary, based on the azimuthal resistivity measurements, to maintain a certain distance between the steerable housing and the approaching upper or lower boundary of the formation.

Embodiments disclosed herein may include a method of directional drilling, further comprising steering the drill bit by radially extending one or more rams disposed within the non-rotating housing outward to press against the wellbore thereby causing the drill bit to press on an opposite side of the wellbore and cause a direction change.

Embodiments disclosed herein may include a method of directional drilling wherein the control module is configured to execute a pre-programmed well trajectory.

Embodiments disclosed herein may include a method of directional drilling, wherein the control module is configured to control a vertical component of the well path.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A rotary steerable bottom hole assembly comprising:
   a drill bit disposed at a distal end thereof;
   azimuthal resistivity antennas and electronics configured to measure a distance to a formation boundary, the azimuthal resistivity antennas comprising:
   an axial antenna including a wire winding for generating an axial magnetic moment parallel with the longitudinal axis;
   a transverse antenna including an antenna body having a longer axis disposed longitudinally in the housing, and a wire coil having a central axis disposed around the antenna body, wherein the wire coil central axis is substantially perpendicular to the longer axis of the antenna body, and wherein the wire coil is configured to generate a transverse magnetic moment orthogonal to the housing longitudinal axis.

2. The rotary steerable bottom hole assembly of claim 1, further comprising a stabilizer disposed in the bottom hole assembly uphole from the drill bit.

3. The rotary steerable bottom hole assembly of claim 2, further comprising a non-rotating steerable housing having a longitudinal axis and disposed between the stabilizer and the drill bit, wherein the azimuthal resistivity antennas and electronics are in the housing.

4. The rotary steerable bottom hole assembly of claim 3, further comprising a control module in the housing configured to steer the drill bit along a well path and, based on measurements from the azimuthal resistivity antennas, to steer the housing away from an approaching formation boundary and thereby maintain a distance between the steerable housing and upper or lower boundaries of a formation.

5. The rotary steerable bottom hole assembly of claim 4, wherein the non-rotating housing further encloses a hydraulic pump and pump drive for operating one or more rams to steer the drill bit.

6. The rotary steerable bottom hole assembly of claim 4, wherein the control module is configured to execute a pre-programmed well trajectory.

7. The rotary steerable bottom hole assembly of claim 4, wherein the control module is configured to control a vertical component of the well path.

8. A rotary steerable system comprising:
   azimuthal resistivity antennas and electronics configured to measure a distance to an upper or lower formation boundary, the azimuthal resistivity antennas comprising:
   an axial antenna including a wire winding for generating an axial magnetic moment parallel with the longitudinal axis;
   a transverse antenna including an antenna body having a longer axis disposed longitudinally in the housing, and a wire coil having a central axis disposed around the antenna body, wherein the wire coil central axis is substantially perpendicular to the longer axis of the antenna body, and wherein the wire coil is configured to generate a transverse magnetic moment orthogonal to the housing longitudinal axis.

9. The rotary steerable system of claim 8, further comprising a non-rotating housing in which the azimuthal resistivity antennas are enclosed.

10. The rotary steerable system of claim 9, further comprising a control module in the housing configured to steer a drill bit along a well path and, based on measurements from the azimuthal resistivity antennas, to steer the housing away from an approaching upper or lower formation boundary and thereby maintain a distance between the steerable housing and upper or lower formation boundary.

11. The rotary steerable system of claim 10, further comprising a hydraulic pump and pump drive in the housing for operating one or more rams to steer the rotary steerable system.

12. The rotary steerable system of claim 10, wherein the control module is configured to execute a pre-programmed well trajectory.

13. The rotary steerable system of claim 10, wherein the non-rotating housing is disposed between the drill bit and a stabilizer.

14. The rotary steerable system of claim 10, wherein the control module is configured to control a vertical component of the well path.

15. A method of directional drilling comprising:
   measuring a distance between a housing and a distance to an upper or lower formation boundary with azimuthal resistivity antennas comprising:
   an axial antenna including a wire winding for generating an axial magnetic moment parallel with the longitudinal axis; and
   a transverse antenna including an antenna body having a longer axis disposed longitudinally in the housing, and a wire coil having a central axis disposed around the antenna body, wherein the wire coil central axis is substantially perpendicular to the longer axis of the antenna body, and wherein the wire coil is configured to generate a transverse magnetic moment orthogonal to the housing longitudinal axis.

16. The method of claim 15, further comprising steering a drill bit along a well path by operating a rotary steerable system having the azimuthal resistivity antennas and a control module enclosed within a non-rotating steerable housing.

17. The method of claim 16, further comprising steering the drill bit away from an approaching upper or lower formation boundary, based on the azimuthal resistivity measurements, to maintain a distance between the steerable housing and the approaching upper or lower boundary of the formation.

18. The method of claim 17, further comprising steering the drill bit by radially extending one or more rams disposed within the non-rotating housing outward to press against the wellbore thereby causing the drill bit to press on an opposite side of the wellbore and cause a direction change.

19. The method of claim 17, wherein the control module is configured to execute a pre-programmed well trajectory.

20. The method of claim 17, wherein the control module is configured to control a vertical component of the well path.

\* \* \* \* \*